(12) United States Patent
Paparatto et al.

(10) Patent No.: US 6,649,140 B2
(45) Date of Patent: Nov. 18, 2003

(54) PROCESS FOR THE CONTINUOUS PRODUCTION OF HYDROGEN PEROXIDE

(75) Inventors: Giuseppe Paparatto, Cinisello Balsamo (IT); Franco Rivetti, Milan (IT); Pietro Andrigo, Novara (IT); Giordano De Alberti, Besnate (IT)

(73) Assignees: Eni S.p.A., Rome (IT); Enichem S.p.A., San Donato Milanese (IT)

( * ) Notice: Subject to any disclaimer, the term of this patent is extended or adjusted under 35 U.S.C. 154(b) by 293 days.

(21) Appl. No.: 09/870,494

(22) Filed: Jun. 1, 2001

(65) Prior Publication Data

US 2002/0025293 A1 Feb. 28, 2002

(30) Foreign Application Priority Data

Jun. 1, 2000 (IT) ..................................... MI2000A1218

(51) Int. Cl.$^7$ ............................. B01J 21/18; C01B 15/01
(52) U.S. Cl. .................... 423/584; 423/403; 423/415.1; 549/531; 564/259; 568/803
(58) Field of Search ................. 423/584, 403, 423/415.1; 549/531; 564/259; 568/803

(56) References Cited

U.S. PATENT DOCUMENTS

| | | | | |
|---|---|---|---|---|
| 4,389,390 A | * | 6/1983 | Dalton, Jr. et al. | 423/584 |
| 4,772,458 A | * | 9/1988 | Gosser et al. | 423/584 |
| 5,505,921 A | * | 4/1996 | Luckoff et al. | 423/584 |
| 5,641,467 A | | 6/1997 | Huckins | |
| 5,965,101 A | * | 10/1999 | Goto et al. | 423/584 |
| 6,284,213 B1 | * | 9/2001 | Paparatto et al. | 423/584 |
| 6,300,506 B1 | | 10/2001 | Paparatto et al. | |
| 6,468,496 B2 | * | 10/2002 | Jones et al. | 423/584 |

FOREIGN PATENT DOCUMENTS

| | | |
|---|---|---|
| EP | 0 812 836 A1 | 12/1997 |
| EP | 0 978 316 A1 | 2/2000 |
| WO | WO 98/16463 | 4/1998 |

* cited by examiner

*Primary Examiner*—Wayne A. Langel
(74) *Attorney, Agent, or Firm*—Oblon, Spivak, McClelland, Maier & Neustadt, P.C.

(57) ABSTRACT

A process is described for the continuous production of alcoholic or hydro-alcoholic solutions of hydrogen peroxide in a concentration ranging from 2 to 10% by weight and their direct use in oxidation processes.

The process operates under high safety conditions and with a high productivity and molar selectivity towards the formation of $H_2O_2$.

40 Claims, No Drawings

PROCESS FOR THE CONTINUOUS PRODUCTION OF HYDROGEN PEROXIDE

The present invention relates to a process for the continuous production of hydrogen peroxide ($H_2O_2$)

More specifically, the present invention relates to a process for the continuous production of alcoholic or hydroalcoholic solutions of hydrogen peroxide and their direct use in oxidation processes.

In particular, oxidation processes using hydrogen peroxide as oxidizing agent, are known in the art, in which the use of alcoholic or hydro-alcoholic solutions object of the present invention have proved to be useful.

Examples of these processes are those using titanium silicalite as catalysts, such as the epoxidation of olefins (EP-100,119), the ammoximation of carbonyl compounds (U.S. Pat. No. 4,794,198), the oxidation of ammonia to hydroxylamine (U.S. Pat. No. 5,320,819) and the hydroxylation of aromatic hydrocarbons (U.S. Pat. No. 4,369,783).

The industrial production of aqueous solutions of $H_2O_2$ by means of a complex two-step process, is known. In this process a solution of an anthraquinone, such as butylanthraquinone or ethylanthraquinone, in an organic medium immiscible with water is first hydrogenated and then oxidized with air to produce $H_2O_2$ which is subsequently extracted in aqueous phase.

This process is expensive owing to the high investment costs necessary for the complex production unit involved and the necessity of separating and disposing of the by-products generated during the oxidation phase and purifying and reintegrating the anthraquinone solution before being re-used.

For these reasons, processes for the direct synthesis of hydrogen peroxide from $H_2$ and $O_2$ have been studied and seem attractive from a technical and economic point of view.

These processes generally use a catalytic system consisting of a noble metal, particularly metals of the platinum group or their mixtures, in the form of salts or as supported metals, reacting the two gases in a solvent consisting of an aqueous medium or an aqueous-organic medium.

The embodiment of these processes however has proved to be difficult on an industrial scale for the following reasons:

A) the use of mixtures of $H_2$ and $O_2$ in concentrations within the explosivity range, as the mixture becomes explosive when the concentration of $H_2$ exceeds a value which, depending on the pressure and concentration of $O_2$, varies from 4.5 to 6% by volume:

B) even when operating outside the explosivity range of $H_2$—$O_2$ mixtures, the use of high concentrations of $O_2$ is risky to handle and not very compatible with the presence of flammable organic solvent mediums;

C) the use in the reaction medium of high concentrations of promoters, for example acid, halogenated promoters and/or other additives, makes the catalytic system or $H_2O_2$ solution unstable. This makes it necessary to add stabilizers with costly purification operations of the $H_2O_2$ solution produced before its use;

D) low productivity and selectivity of the reaction or the production of $H_2O_2$ solutions which are too dilute for economic industrial exploitation;

E) low stability of the catalytic system under the reaction conditions.

For example, U.S. Pat. Nos. 3,361,533, 4,009,252 and 4,661,337 describe processes for the preparation of $H_2O_2$ which use gaseous mixtures of $H_2$ and $O_2$ which are typically included in the explosivity range.

To avoid these safety problems, some processes use ingenious and complex reactor solutions.

U.S. Pat. No. 5,194,242 describes a continuous process for the preparation of $H_2O_2$ in aqueous solution which comprises the use of a suitable reactor and a mixture of $H_2$ and $O_2$ in ratios with each other within the explosivity range in the feeding to the reactor, but outside this range in the gaseous stream leaving the reactor.

U.S. Pat. No. 5,641,467 describes a continuous process for the preparation of $H_2O_2$ from $H_2$ and $O_2$ which operates within the explosivity range of $H_2/O_2$ mixtures using a reaction apparatus suitable for producing a series of gas bubbles sufficiently small and sufficiently dispersed and separate from each other in the liquid reaction medium as to avoid any possible explosion in the reactor.

These processes however are complex from an industrial point of view and their intrinsic safety is doubtful.

Numerous other processes describe, on the other hand, the use of mixtures of $H_2$ and $O_2$ poor in hydrogen, i.e. with concentrations of $H_2$ of less than 4–5% by volume with respect to the gaseous mixture, for the same purpose, i.e. to avoid safety problems deriving from the use of explosive $H_2$—$O_2$ mixtures.

These processes, however, use extremely high concentrations of $O_2$, whose use is only possible when operating in an aqueous solvent medium and they are therefore normally directed towards the production of aqueous $H_2O_2$ solutions, excluding the presence of organic mediums.

For example, U.S. Pat. No. 5,500,202 describes a continuous process for the preparation of aqueous solutions of $H_2O_2$ from $H_2$ and $O_2$ which operates in a "trickle bed" reactor using, in the feeding, a gaseous mixture of $H_2/O_2/N_2$ containing 4.6–6.2% by volume of $H_2$ and 57–62% by volume of $O_2$, so that the mixture leaving the reactor is outside the explosivity range.

U.S. Pat. No. 4,279,883 describes a continuous process for the preparation of aqueous solutions of $H_2O_2$ from $H_2$ and $O_2$ characterized by a particular pre-treatment of the solution and catalyst with $H_2$ and in which the mixtures of gases at the outlet of the reactor is kept with the volume composition of 3% $H_2$ and 30% $O_2$, the remaining percentage being $N_2$.

International patent application WO 93/14025 describes a process for the preparation of aqueous solutions of $H_2O_2$ from $H_2$ and $O_2$ characterized by the use of particular catalysts and stabilizers of the catalytic activity and carried out in the presence of gaseous mixtures kept outside the explosivity limits of $H_2$, with $O_2$ being fed in pure form or preferably mixed with $N_2$ to obtain a preferred $H_2/O_2/N_2$ composition equal to 3.2%/86.8%/10.0% respectively by volume.

International patent application WO 92/15520 describes a process for the preparation of aqueous solutions of $H_2O_2$ from $H_2$ and $O_2$ characterized by the use of particular catalysts and stabilizers of the catalytic activity and carried out in the presence of gaseous mixtures kept outside the explosivity limits of $H_2$, with $O_2$ being fed in pure form without inert gases.

European patent application EP-627,381 describes a process for the preparation of aqueous solutions of $H_2O_2$ from $H_2$ and $O_2$ characterized by the use of particular catalysts and carried out in the presence of gaseous mixtures kept outside the explosivity limits of $H_2$ in the presence of inert gases such as nitrogen so as to obtain a preferred $H_2/O_2/N_2$ composition equal to 3%/47%/50% respectively by volume.

In all these processes high concentrations of $O_2$ are used, which are scarcely compatible with the use of flammable organic reaction solvent mediums.

In other cases, the use of mixtures of $H_2$ and $O_2$ outside the explosivity range and using low concentrations of $O_2$ prove to have a low reaction productivity and selectivity or to produce $H_2O_2$ solutions which are too dilute for an economic industrial exploitation.

For example U.S. Pat. No. 5,082,647 describes a process for the preparation of aqueous solutions of $H_2O_2$ from $H_2$ and $O_2$ characterized by the use of particular catalysts and carried out in a trickle bed reactor, feeding a gaseous mixture containing 3% of $H_2$ by volume in air. In the example described, after 5 hours the solution re-circulated through the reactor contained 0.3% of $H_2O_2$.

From what is specified above, the objective of setting up a process for the direct synthesis of $H_2O_2$ from $H_2$ and $O_2$ which can be used on an industrial scale under safety and economically advantageous conditions, does not appear to have been reached as yet.

In particular, the objective of producing stable solutions of $H_2O_2$ in aqueous-organic mediums with a concentration suitable for direct use in oxidation processes, on an industrial scale and under safety and economically advantageous conditions, seems even more difficult to reach.

For example, U.S. Pat. Nos. 4,389,390 and 4,336,238 describe a continuous process for the preparation of aqueous-organic solutions of $H_2O_2$ from $H_2$ and $O_2$ which use a vertical tubular catalytic packed reactor operating in equicurrent of gas and liquid and using a gaseous mixture of $H_2/O_2$ in the feeding, containing 6.3% by volume of $H_2$ and 95.7% by volume of $O_2$.

European patent applications EP-787,681 and EP-812,836, directed towards the production of aqueous-alcoholic solutions of $H_2O_2$ and their use in the epoxidation of propylene, describe processes for the preparation of these solutions in the presence of a halide and a metal of the platinum group, with the use of $H_2/O_2/N_2$ mixtures having a composition equal to 2.4%/24%/73.6% respectively by volume, or using $H_2$ diluted in air outside the explosivity limits, in which the concentration of $H_2O_2$ in the solutions obtained ranges from 0.05% to 0.39% by weight.

International patent application WO 98/16463 likewise describes a process directed towards the production of aqueous-alcoholic solutions containing at least 2.5% by weight of $H_2O_2$, carried out on monolithic formed catalytic bodies, which uses mixtures of $H_2$ and $O_2$, optionally in the presence of inert gases, or mixtures of $H_2$ and air outside the explosivity limits for $H_2$.

The illustrative examples of this document however all comprise the use of mixtures of $H_2$ with pure $O_2$. In addition, from the examples it can be observed that when the gas stream fed to the reactor is within the explosivity limits ($H_2$ concentration equal to 10% by volume in pure $O_2$), solutions of $H_2O_2$ are obtained at 4–7% by weight with selectivities with respect to $H_2$ ranging from 70 to 82%. Viceversa, when a gas stream is used in the feeding outside the explosivity limits, (concentration of $H_2$ equal to 4% by volume in pure $O_2$), the concentration of $H_2O_2$ obtained does not exceed 2.7% and the selectivity calculated with respect to $H_2$ drops to 68%.

Therefore not even this process overcomes the problems deriving from the use of explosive mixtures of $H_2$—$O_2$ and from the poor compatibility of high concentrations of $O_2$ with flammable organic reaction mediums.

It has now been found, according to the present invention, that it is possible to overcome the drawbacks of the known art discussed above, using a bimetal catalyst based on palladium and platinum as active components, a liquid reaction medium consisting of an alcohol or an alcohol-water mixture with a prevalent alcoholic content and a gaseous stream containing hydrogen, oxygen and an inert gas, in which the concentration of hydrogen is less than 4.5% by volume, the concentration of oxygen is less than 21% by volume, the complement to 100 being inert gas, to produce alcoholic or alcohol-aqueous solutions of $H_2O_2$ at a concentration ranging from 2 to 10% by weight with a high reaction productivity and selectivity and a high stability of the catalytic activity over a period of time.

These reaction conditions provide substantial advantages, in particular:

(1) The possibility of carrying out the process under high safety conditions, with respect to the handling of both hydrogen-oxygen mixtures and alcohol-oxygen mixtures. In fact, operating below 4.5% by volume of hydrogen is well outside the explosivity zone of $H_2$—$O_2$-inert gas mixtures. Similarly, when operating below 21% by volume of $O_2$, risks deriving from the presence of alcohol in the gaseous phase, owing to the reduced quantity of fuel in the reaction medium, are minimized.

In addition, the concentration of $H_2O_2$ in the solutions produced according to the invention is such that there are no instability phenomena linked to the presence of organic solvent, phenomena which normally occur at much higher concentrations.

(2) The possibility of minimizing the concentrations of acid and halogenated promoter present in the liquid reaction medium. This has beneficial effects on the stability of the catalytic system, on the stability of the $H_2O_2$ solutions obtained and on the possibility of the direct use of the above solutions in the oxidation processes mentioned above.

(3) The production of solutions of hydrogen peroxide with a composition and concentration adequate for direct use and economically valid in oxidation processes, generally ranging from 2% to 10% by weight.

In accordance with this, the present invention relates to a process for the continuous production of alcoholic or hydroalcoholic solutions with a prevalent alcoholic content of hydrogen peroxide, which comprises:

(a) feeding to a reactor, which contains a catalyst based on palladium and platinum, heterogeneous and maintained in dispersion in a liquid reaction medium:
  (i) a liquid stream consisting of an alcohol or an alcohol-water mixture with a prevalent alcoholic content containing an acid promoter and a halogenated promoter;
  (ii) a gaseous stream containing hydrogen, oxygen and an inert gas, characterized in that the concentration of hydrogen is lower than 4.5% by volume and the concentration of oxygen is lower than 21% by volume, the complement to 100 being an inert gas;
(b) removing from the reactor:
  (iii) a liquid stream essentially consisting of the stream (i) and also containing hydrogen peroxide and the water produced by the reaction, characterized in that the concentration of hydrogen peroxide ranges from 2% to 10% by weight; and
(iv) a gaseous stream essentially consisting of non-reacted hydrogen and oxygen and the inert gas.

The reactor used can be any reactor suitable for operating in continuous and conducting the reaction in a tri-phasic system such as that described, obtaining an effective contact between the gaseous phase, liquid phase and the catalyst maintained in dispersion (so-called slurry system).

Reactors suitable for the purpose are, for example, stirred reactors, bubble reactors, gas-lift reactors with internal or external circulation, as described in the art.

The reactor is kept under suitable temperature and pressure conditions. According to the process object of the present invention, the temperature normally ranges from −10° C. to 60° C., preferably from 0° C. to 40° C. The pressure normally ranges from 1 to 300 bars, preferably from 40 to 150 bars.

The residence time of the liquid medium in the reactor normally ranges from 0.05 to 5 hours, preferably from 0.10 to 2 hours.

The catalyst which can be used for the purposes of the present invention is a heterogeneous catalyst containing palladium and platinum as active components.

In these catalysts, the palladium is normally present in a quantity ranging from 0.1 to 3% by weight and the platinum in a quantity ranging from 0.01 to 1% by weight, with an atomic ratio between platinum and palladium ranging from 1/500 to 100/100.

The palladium is preferably present in a quantity ranging from 0.4 to 2% by weight and the platinum in a quantity ranging from 0.02 to 0.5% by weight, with an atomic ratio between platinum and palladium ranging from 1/200 to 20/100.

In addition to palladium and platinum, other metals of group VIII or IB, such as for example, ruthenium, rhodium, iridium and gold, can be present as active components or promoters, in a concentration generally not higher than that of the palladium.

The catalyst can be prepared by dispersing the active components on an inert carrier by means of precipitation and/or impregnation starting from precursors consisting for example of solutions of their salts or soluble complexes, and then reduced to the metal state by means of thermal and/or chemical treatment with reducing substances such as hydrogen, sodium formiate, sodium citrate using preparative techniques well known in the art.

The inert carrier may typically consist of silica, alumina, silica-alumina, zeolites, activated carbon, and other materials well known in the art. Activated carbon is preferred for the preparation of the catalysts useful for the invention.

Activated carbons which can be used for the purposes of the invention are selected from those of a fossil or natural origin deriving from wood, lignite, peat or coconut and having a surface area greater than 300 m$^2$/g and which can reach 1400 m$^2$/g, in particular those having a surface area greater than 600 m$^2$/g.

Preferred activated carbons are those with a low ash content.

Sulfonated activated carbons described in Italian patent application MI 98A01843 are also useful for the purpose.

Before supporting or impregnating the metals, the activated carbon can be subjected to treatment such as washing with distilled water or treatment with acids, bases or diluted oxidizing agents, for example acetic acid, hydrochloric acid, sodium carbonate and hydrogen peroxide.

The catalyst is normally dispersed in the reaction medium at a concentration ranging from 0.1 to 10% by weight, preferably from 0.3 to 3% by weight.

The liquid stream (i) consists of an alcohol or mixture of $C_1$–$C_3$ alcohols or a mixture of these alcohols with water with a prevalent alcoholic content. A mixture with a prevalent alcoholic content means a mixture containing more than 50% by weight of alcohol or mixture of alcohols. Among $C_1$–$C_3$ alcohols methanol is preferred for the purposes of the present invention. Among the mixtures, a mixture of methanol and water containing at least 70% by weight of methanol, is preferred.

The liquid stream also contains an acid promoter and halogenated promoter.

The acid promoter can be any substance capable of generating H$^+$ hydrogen ions in the liquid reaction medium and is generally selected from inorganic acids such as sulfuric, phosphoric, nitric acids or from organic acids such as sulfonic acids. Sulfuric acid and phosphoric acid are preferred. The concentration of the acid generally ranges from 20 to 1000 mg per kg of solution and preferably from 50 to 500 mg per kg of solution.

The halogenated promoter can be any substance capable of generating halogen ions in the liquid reaction medium. Substances capable of generating bromide ions are preferred. These substances are generally selected from hydrobromic acid and its salts soluble in the reaction medium, for example alkaline bromides, hydrobromic acid being preferred. The concentration of halogenated promoter generally ranges from 0.1 to 50 mg per kg of liquid medium and preferably from 1 to 10 mg per kg of liquid medium.

The gaseous stream (ii) at the inlet contains a concentration of hydrogen of less than 4.5% by volume and a concentration of oxygen of less than 21% by volume, the complement to 100 being an inert gas, which is generally selected from nitrogen, helium, argon. Said gas is preferably nitrogen.

In the gaseous stream (ii) the concentration of hydrogen preferably ranges from 2% to 4% by volume and the concentration of oxygen preferably ranges from 6% to 15% by volume.

The oxygen can be supplied in said stream using as raw material, pure or substantially pure oxygen, enriched air, containing for example from 21 to 90% of oxygen or air, the composition of the stream then-being brought to the desired values, defined above, by the addition of a suitable concentration of inert gas.

The liquid stream (iii) at the outlet of the reactor normally has a concentration of hydrogen peroxide ranging from 2% to 10% by weight and preferably from 3% to 8% by weight. It also contains the acid promoter and halogenated promoter in quantities equal to those introduced together with the liquid stream fed, and water in a quantity equal to that introduced with the liquid stream fed, to which the water obtained as reaction by-product is added. The latter normally represents an additional concentration ranging from 0.5% to 2.5% by weight.

The liquid stream (iii) is separated from the catalyst by means of filtration techniques well known in the art, for example by the use of filter plugs situated inside the reactor or in a specific re-circulation cycle of the reaction mixture, outside the reactor. In this latter case the tangential filtration technique can also be conveniently used.

The liquid stream (iii) is stable to storage without the necessity of adding stabilizing substances and is suitable for direct use in oxidation processes downstream such as the ammoximation of cyclohexanone to cyclohexanone-oxime in the presence of ammonia and $H_2O_2$ and the oxidation reaction with $H_2O_2$ of propylene to propylene oxide.

The gaseous stream (iv) at the outlet of the reactor, essentially consisting of non-reacted hydrogen and oxygen and of the inert gas, generally contains a volume concentration of hydrogen equal to or lower than 2%, normally ranging from 0.5 to 1.5%, and a volume concentration of oxygen generally lower than 18%, normally ranging from 6% to 12%.

In an embodiment of the process of the present invention, the gaseous stream at the outlet of the reactor is (recycled to the feeding to the reactor, after flushing from the system, the fraction necessary for eliminating the quantity of inert gas introduced in excess with the feeding particularly when air is used as oxygen source. In this case, the gaseous stream (ii) fed to the reactor consists of the recycled fraction of the above stream (iv), with the addition of a quantity of hydrogen and oxygen (as such or in the form of air or enriched air) essentially equal to that used up by the reaction and that flushed.

According to another embodiment of the process of the present invention, the gaseous stream (iv) leaving the reactor is fed to one or more subsequent reactors operating analogously to the one previously described, after adding each time a quantity of hydrogen and oxygen (as such or in the form of air or enriched air) essentially equal to that used up by the reaction which takes place in the single reactors.

Operating under the above conditions, it is possible to produce hydrogen peroxide under safety conditions with a reaction productivity normally ranging from 30 to 200 g of $H_2O_2$ (expressed as 100% $H_2O_2$) per liter of reaction medium per hour and with a molar selectivity towards the formation of $H_2O_2$, referring to the hydrogen used up, generally higher than 65%.

The following examples are illustrative but do not limit the scope of the invention described.

EXAMPLE 1

Treatment of the Carrier 50 g of activated maritime pine charcoal in powder form (CECA) and 500 ml of distilled water are charged into a 1 liter glass flask. After 2 hours at 80° C., the charcoal is filtered and washed with 500 ml of distilled water.

The carbon, still damp, is then charged into the 1 liter flask and after adding 500 ml of a solution at 2% by weight of HCl, the temperature is brought to 80° C. After about 2 hours, the mixture is cooled and the activated carbon is washed on a filter with distilled $H_2O$ until the chlorides have been eliminated. The washed activated carbon is recovered and dried in an oven at 120° C. for 2 hours.

EXAMPLE 2

Preparation of the Catalyst 1%Pd-0.1%Pt/C 10 g of activated carbon treated as described in example 1, are charged into a 0.5 liter glass flask, containing 100 ml of distilled water and 0.32 g of $Na_2CO_3$. The suspension is maintained at room temperature (20–25° C.), under stirring, for 10 minutes.

10 ml of an aqueous solution containing 1.0 g of a solution of $Na_2PdCl_4$ at 10% by weight of Pd and 0.1 g of a solution of $H_2PtCl_6$ at 10% by weight, are subsequently added dropwise over a period of about 10 minutes.

The suspension is kept at room temperature for 10 minutes and is then heated in a water bath for 10 minutes to 90° C. A solution containing 0.85 g of sodium formate in 10 ml of water is then added and the stirring is continued at 90° C. for 2 hours.

After cooling to room temperature, the suspension is filtered and the catalyst recovered is washed with distilled water until the chlorides have been eliminated and dried in an oven at 120° C. for 2 hours.

EXAMPLE 3

Preparation of the Catalyst 1% Pd/C

The same procedure is used as in example 2, but using 10 ml of an aqueous solution containing 1.0 g of a solution of $Na_2PdCl_4$ at 10% by weight of Pd.

EXAMPLE 4

Preparation of the Catalyst 1% Pt/C

The same procedure is used as in example 2, but using 10 ml of an aqueous solution containing 1.0 g of a solution of $H_2PtCl_6$ at 10% by weight.

EXAMPLE 5

Synthesis of $H_2O_2$

A micropilot plant is used, consisting of a Hastelloy C autoclave having a volume of 400 ml, equipped with a thermostat-regulation system, a magnetic drag stirring-system, a regulation and control system of the pressure during the reaction, a filter for continuously removing the liquid phase containing the reaction products, a feeding system of the mixture of the solvent and promoters in which the reaction takes place, a feeding system of the gaseous reagents and a series of regulation and control instruments.

The reaction trend is followed by continuously analyzing the hydrogen and oxygen in the feeding and at the outlet of the reactor.

The concentration of $H_2O_2$ which is formed is determined in the reactor liquid effluent by titration with potassium permanganate. The selectivity with respect to the converted hydrogen is calculated on the basis of the concentration of $H_2O_2$ in the reaction effluent and on the basis of analysis of the $H_2$ leaving the reactor, once the stationary state has been reached in the reactor.

1.2 g of catalyst prepared as described in example 2 and 150 g of methanol:water solution (95/5 by weight) containing 6 ppm of HBr and 300 ppm of $H_2SO_4$ are charged into the reactor.

The autoclave is pressurized, without stirring, at 100 bars with a gaseous mixture consisting of 3.6% of $H_2$, 11% of $O_2$ and 85.4% of $N_2$ by volume. The stirring is then started up to 800 revs/minute, the pressure is maintained with a continuous stream, 810 normal liters (Nl), of the same gaseous mixture, and 300 g/hour of a methanol:water solution having the composition defined above, is fed at the same time. The temperature inside the reactor is kept at 8° C. The results are indicated in Table 1.

TABLE 1

| Hrs of reaction | $H_2O_2$ wt % | Molar selectivity $H_2O_2$ % |
|---|---|---|
| 10 | 6.8 | 67 |
| 100 | 6.9 | 70 |
| 200 | 7.0 | 71 |
| 300 | 6.9 | 69 |
| 400 | 7.1 | 71 |
| 500 | 7.2 | 73 |
| 600 | 7.1 | 72 |
| 700 | 7.3 | 74 |
| 800 | 7.2 | 73 |

EXAMPLE 6 (Comparative)

Synthesis of Hydrogen Peroxide in the Presence of the Catalyst Pd/C

Example 5 is repeated using the catalyst prepared in example 3.

The results obtained are indicated in Table 2.

TABLE 2

| Hrs of reaction | $H_2O_2$ wt % | Molar selectivity $H_2O_2$ % |
|---|---|---|
| 5 | 0.7 | 30 |
| 10 | 0.6 | 32 |

EXAMPLE 7 (Comparative)

Synthesis of Hydrogen Peroxide in the Presence of the Catalyst Pt/C

Example 5 is repeated using the catalyst prepared in example 4.

The results obtained are indicated in Table 3.

TABLE 3

| Hrs of reaction | $H_2O_2$ wt % | Molar selectivity $H_2O_2$ % |
|---|---|---|
| 5 | 1.5 | 20 |
| 10 | 1.3 | 24 |

EXAMPLE 8 (Comparative)

The reaction is carried out as described in example 5, but using 150 g of water instead of the hydro-alcoholic mixture. The results obtained are indicated in Table 4.

TABLE 4

| Hrs of reaction | $H_2O_2$ wt % | Molar selectivity $H_2O_2$ % |
|---|---|---|
| 5 | 2 | 64 |
| 10 | 1.8 | 62 |
| 20 | 1.7 | 60 |
| 30 | 1.8 | 61 |

What is claimed is:

1. A process for the continuous production of alcoholic or hydro-alcoholic solutions having more than 50% by weight of at least one alcohol, of hydrogen peroxide, which comprises:
   (a) feeding to a reactor, which comprises a catalyst comprising palladium and platinum metals, heterogeneous and maintained in dispersion in a liquid reaction medium:
      (i) a liquid stream comprising an alcohol or an alcohol-water mixture, having more than 50% by weight of at least one alcohol, an acid promoter, and a halogenated promoter wherein the concentration of acid promoter is from 20 to 1000 mg per kg of solution and the concentration of the halogenated promoter is from 1–10 mg per kg of solution;
      (ii) a gaseous stream of hydrogen, oxygen and an inert gas, wherein the concentration of hydrogen is lower than 4.5% by volume and the concentration of oxygen is lower than 21% by volume, the remainder being the inert gas;
   (b) removing from the reactor:
      (iii) a liquid stream comprising stream (i), hydrogen peroxide and water produced by reaction, wherein the concentration of hydrogen peroxide ranges from 2% to 10% by weight; and
      (iv) a gaseous stream comprising hydrogen, oxygen and the inert gas.

2. The process according to claim 1, wherein the catalyst comprises palladium in a quantity ranging from 0.1 to 3% by weight and platinum in a quantity ranging from 0.01 to 1% by weight, with an atomic ratio between platinum and palladium ranging from 1/500 to 100/100.

3. The process according to claim 2, wherein the catalyst comprises a quantity of palladium ranging from 0.4 to 2% by weight and a quantity of platinum ranging from 0.02 to 0.5% by weight, with an atomic ratio between platinum and palladium ranging from 1/200 to 20/100.

4. The process according to claim 1, wherein the catalyst further comprises another metal selected from the group consisting of group VIII and IB metals.

5. The process according to claim 4, wherein the metal is ruthenium, rhodium, iridium or gold.

6. The process according to claim 1, wherein the catalyst is prepared by dispersing active components on an inert carrier by means of precipitation and/or impregnation.

7. The process according to claim 6, wherein the inert carrier is selected from the group consisting of silica, alumina, silica-alumina, zeolites, activated carbon and activated carbon functionalized with sulfonic groups.

8. The process according to claim 7, wherein the carrier is an activated carbon of fossil or natural origin deriving from wood, lignite, peat or coconut and having a surface area greater than 300 $m^2/g$.

9. The process according to claim 8, wherein the carrier is an activated carbon having a surface area up to a value of 1400 $m^2/g$.

10. The process according to claim 8, wherein the carrier is an activated carbon having a surface area greater than 600 $m^2/g$.

11. The process according to claim 8, wherein the activated carbon has a low ash content.

12. The process according to claim 1, wherein the catalyst is dispersed in the reaction medium at a concentration of 0.1 to 10% by weight.

13. The process according to claim 12, wherein the catalyst is dispersed in the reaction medium at a concentration ranging from 0.3 to 3% by weight.

14. The process according to claim 1, wherein the liquid stream (i) consists of an alcohol or a mixture of $C_1$–$C_3$ alcohols or a mixture of said alcohols with water with an alcoholic content higher than 50%.

15. The process according to claim 14, wherein the alcohol is methanol.

16. The process according to claim 14, wherein the liquid stream (i) comprises a mixture of methanol and water containing at least 70% by weight of methanol.

17. The process according to claim 1, wherein the halogenated promoter is selected from the group consisting of substances capable of generating bromide ions.

18. The process according to claim 17, wherein the promoter is hydrobromic acid.

19. The process according to claim 1, wherein the acid promoter is selected from the group consisting of inorganic acids and organic acids.

20. The process according to claim 1, wherein the acid promoter is sulfuric acid or phosphoric acid.

21. The process according to claim 1, wherein the concentration of acid promoter is 50 to 500 mg per kg of solution.

22. The process according to claim 1, wherein in the gaseous stream (ii), the concentration of hydrogen ranges from 2% to 4.5% by volume and the concentration of oxygen ranges from 6% to 15% by volume, the inert gas being selected from the group consisting of nitrogen, helium and argon.

23. The process according to claim 22, wherein the inert gas is nitrogen.

24. The process according to claim 1, wherein in the gaseous stream (ii) the oxygen is supplied using as raw material, pure or substantially pure oxygen, enriched air, containing from 21 to 90% of oxygen or air, the composition of the stream then being brought to a concentration lower than 21% by volume by the addition of inert gas.

25. The process according to claim 24, wherein the liquid stream (iii) leaving the reactor has a concentration of hydrogen peroxide of 3% to 8% by weight.

26. The process according to claim 1, wherein the liquid stream (iii) is separated from the catalyst by filtration.

27. The process according to claim 26, wherein the filtration is carried out using filter plugs situated inside the reactor or by tangential filtration.

28. The process according to claim 1, wherein the gaseous stream (iv) leaving the reactor comprises a volume concentration of hydrogen equal to or lower than 2% and a volume concentration of oxygen lower than 18%.

29. The process according to claim 28, wherein the gaseous stream (iv) leaving the reactor contains a volume concentration of hydrogen of 0.5 to 1.5% and a volume concentration of oxygen of 6 to 12%.

30. The process according to claim 1, wherein the gaseous stream (iv) leaving the reactor is recycled to the feeding to the reactor, after flushing from the system the fraction necessary for eliminating the quantity of inert gas introduced in excess with the feeding and addition of $H_2$ and $O_2$ used up in the process.

31. The process according to claim 1, wherein the gaseous stream (iv) leaving the reactor is fed to one or more subsequent reactors operating analogously to that described in claim 1, after the addition each time of a quantity of hydrogen and oxygen essentially equal to that used up by the reaction which takes place in the first reactor.

32. The process according to claim 1, wherein the reaction is carried out at a temperature of −10 to 60° C.

33. The process according to claim 32, wherein the temperature is 0 to 40° C.

34. The process according to claim 1, wherein the reaction is carried out at a total pressure of 1 to 300 bars.

35. The process according to claim 34, wherein the total pressure is 40 to 150 bars.

36. The process according to claim 1, wherein the reactor is a reactor capable of operating continuously and carrying out the reaction in a triphasic system, obtaining an effective contact between the gas phase, the liquid phase and the catalyst held in dispersion.

37. The process according to claim 36, wherein the reactor is selected from the group consisting of stirred reactors, bubble reactors and gas-lift reactors with internal or external circulation.

38. The process according to claim 1, wherein the residence time of the liquid medium in the reactor is 0.05 to 5 hours.

39. The process according to claim 38, wherein the residence time of the liquid medium in the reactor is 0.1 to 2 hours.

40. The process according to claim 1, wherein the liquid stream (iii) is used directly in an oxidation process of a substrate selected from the group consisting of olefins, aromatic hydro carbons, ammonia and carbonyl compounds using titanium silicalite as catalysts.

* * * * *